(12) United States Patent
Ganapathiappan et al.

(10) Patent No.: US 8,258,204 B2
(45) Date of Patent: Sep. 4, 2012

(54) LATEX POLYMER WITH SPECIFIC COMPOSITION FOR INKJET PRINTING ON VINYL MEDIA

(75) Inventors: Sivapackia Ganapathiappan, Los Altos, CA (US); Howard S. Tom, San Jose, CA (US); Hou Ng, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 448 days.

(21) Appl. No.: 12/685,530

(22) Filed: Jan. 11, 2010

(65) Prior Publication Data

US 2011/0171386 A1 Jul. 14, 2011

(51) Int. Cl.
 *C09D 11/10* (2006.01)
(52) U.S. Cl. ........ 523/160; 523/161; 524/556; 524/562; 524/565; 524/577; 347/100; 427/466; 427/469
(58) Field of Classification Search .................. 523/160, 523/161; 524/556, 562, 565, 577; 347/100; 427/466, 469
See application file for complete search history.

(56) References Cited

U.S. PATENT DOCUMENTS

2003/0203988 A1* 10/2003 Erdtmann et al. ............ 523/160
* cited by examiner

*Primary Examiner* — David W Wu
*Assistant Examiner* — Vu A Nguyen
(74) *Attorney, Agent, or Firm* — David W. Collins

(57) ABSTRACT

An inkjet printing composition comprises an aqueous liquid vehicle; at least one pigment having a concentration of about 1 to 5 wt %; and a latex polymer having a concentration of about 2.5 to 8 wt % and comprising a polymerized mixture of styrene, butyl acrylate, at least one of methacrylonitrile and acrylonitrile, methacrylic acid, and ethylene glycol dimethacrylate. An inkjet ink printing system comprises a vinyl medium; the at least one inkjet printing composition; and a heating device, wherein the system is configured such that upon applying heat from the heating device to the inkjet ink printed on the vinyl medium, the latex particles fuse, thereby forming a printed image with a film encapsulating at least a portion of the pigment on the vinyl medium. A method of forming a printed image of the latex polymer using the inkjet ink printing system is also provided.

19 Claims, 1 Drawing Sheet

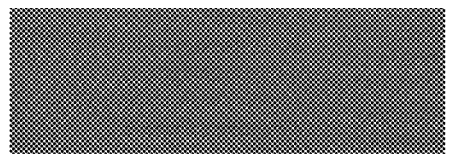
Fig. 1A                    Fig. 1B
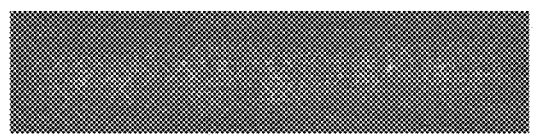
Fig. 2A                    Fig. 2B
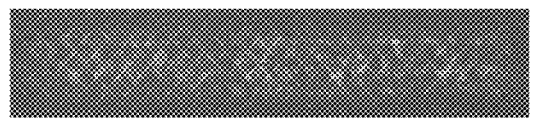
Fig. 3A                    Fig. 3B

LATEX POLYMER WITH SPECIFIC COMPOSITION FOR INKJET PRINTING ON VINYL MEDIA

BACKGROUND

Polymers are often used to improve the durability of prints using a variety of printing techniques. One example is the dry toner used in the commercial printers. These include polymers that are insoluble in water and typically do not include surface groups for stabilization for printability. Usage of such polymers is therefore difficult in water-based inkjet inks. To overcome this problem, latex polymers are sometimes used since such polymers show low viscosity with higher amount of solid contents. However, the final print durability is typically not as good compared to electrophotography-based (i.e. laser-based) print. In some cases, chemical fixers are used to improve waterfastness. However, such a system often does not show the desired improvement in terms of rub resistance.

Highlighter smear fastness, rub resistance, wet smudge fastness, light fastness, ozone fastness, and optical density after highlighter smear are aspects of durability of inkjet ink prints. Such aspects of durability of inkjet ink prints on vinyl print media is not as good compared to laser-based and electrophotography-based prints.

BRIEF DESCRIPTION OF THE DRAWINGS

Additional features and advantages of the invention will be apparent from the detailed description which follows, taken in conjunction with the accompanying figures, which together illustrate, by way of example, features of the invention.

FIGS. 1A-1B are each a photograph of the result of a window cleaner test and a dry rub test, respectively, of an inkjet ink according to embodiments of the invention and described in Example 3.

FIGS. 2A-2B are each a photograph of the result of a window cleaner test and a dry rub test, respectively, of an inkjet ink according to embodiments of the invention and described in Example 6.

FIGS. 3A-3B are each a photograph of the result of a window cleaner test and a dry rub test, respectively, of the inkjet ink described in Example 7 for comparison purposes.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this disclosure is not limited to the particular process steps and materials disclosed herein because such process steps and materials may vary somewhat. It is also to be understood that the terminology used herein is used for the purpose of describing particular embodiments only. The terms are not intended to be limiting because the scope of the present disclosure is intended to be limited only by the appended claims and equivalents thereof.

It is to be noted that, as used in this specification and the appended claims, the singular forms "a," "an," and "the" include plural referents unless the context clearly dictates otherwise.

As used herein, "liquid vehicle," "vehicle," or "liquid medium" refers to the fluid in which the colorant of the present disclosure can be dispersed or dissolved to form an inkjet ink. Liquid vehicles are well known in the art, and a wide variety of ink vehicles may be used in accordance with embodiments of the present disclosure. Such ink vehicles may include a mixture of a variety of different agents, including without limitation, surfactants, organic solvents and co-solvents, buffers, biocides, viscosity modifiers, sequestering agents, stabilizing agents, anti-kogation agents, and water. Though not part of the liquid vehicle per se, in addition to the colorants, the liquid vehicle can carry solid additives such as polymers, latexes, UV curable materials, plasticizers, salts, etc. Additionally, the term "aqueous liquid vehicle" or "aqueous vehicle" refers to a liquid vehicle including water as a solvent. This refers in particular to liquid vehicles that are predominantly water, that is, in which water is present in an amount greater than any other individual liquid component.

As used herein, "liquid vehicle component" refers to any solvent, surfactant, and/or any other liquid present in a liquid vehicle.

As used herein, "colorant" can include dyes, pigments, and/or other particulates that may be suspended or dissolved in a liquid vehicle prepared in accordance with embodiments of the present disclosure. Dyes are typically water soluble, and therefore, can be desirable for use in some embodiments. However, pigments can also be used in other embodiments. Pigments that can be used include self-dispersed pigments and standard pigments that are dispersed by a separate dispersing agent, e.g., polymer-dispersed. Self-dispersed pigments include those that have been chemically surface modified with a small molecule, a polymeric grouping, or a charge. This chemical modification aids the pigment in becoming and/or substantially remaining dispersed in a liquid vehicle. The pigment can also be dispersed by a separate additive, e.g. a polymer, an oligomer, or a surfactant, in the liquid vehicle and/or in the pigment that utilizes a physical coating to aid the pigment in becoming and/or substantially remaining dispersed in a liquid vehicle.

As used herein, "pigment" generally includes pigment colorants, magnetic particles, aluminas, silicas, and/or other ceramics, organo-metallics or other opaque particles, whether or not such particulates impart color. Thus, though the present description primarily exemplifies the use of pigment colorants, the term "pigment" can be used more generally to describe not only pigment colorants, but other pigments such as organometallics, ferrites, ceramics, etc. In one specific embodiment, however, the pigment is a pigment colorant.

As used herein, "dye" refers to the individual compound, complex, or molecule responsible for an ink's color, and is typically water soluble.

As used herein, $T_g$ is the glass transition temperature as calculated by the Fox equation: copolymer $T_g=1/(Wa/(T_gA)+Wb(T_gB)+\ldots)$, where $Wa$=weight fraction of monomer A in the copolymer and $T_gA$ is the homopolymer $T_g$ value of monomer A, $Wb$=weight fraction of monomer B and $T_gB$ is the homopolymer $T_g$ value of monomer B, etc.

As used herein, the terms "rubfastness" and "smearfastness" each refer to the resistance of a printed ink image to removal by rubbing with a solid object. One type of smear fastness of interest in the inkjet printing art is resistance to rubbing with the tip of a highlighter. Another type of disruption due to rubbing can include actual removal of the printed ink from the media surface. For example, dry rubbing and/or rubbing using ammonia cleaning solvent (Windex®) for ink printed on vinyl media is another example of determining rubfastness. Poor rubfastness results from insufficient adherence of the ink to the media surface or absorbance of the ink into the surface, as well as insufficient shear resistance within the printed ink.

As used herein, the term "waterfastness" refers to the resistance of a printed ink image to dilution or removal by exposure to water. Waterfastness can be measured by wetting printed ink with water or an aqueous solution and determining any change in optical density of the printed ink.

When evaluating "rubfastness" or "waterfastness" of an image printed in accordance with the system and/or method of the present disclosure, "increased" or "improved" rubfastness can be determined by comparing the printed image with a comparative printed image. The comparative printed image can be prepared identically to the printed image except that the polymer particles used to generate the comparative printed image do not comprise the polymerized mixture of styrene, butyl acrylate, methacrylonitrile, methacrylic acid, and ethylene glycol dimethacrylate, particularly in the range of ratios given below. No other changes to the printing and fusing conditions are carried out.

The term "non-porous" when referring media refers to print media which has a Bristow Test of less than 2 ml/m$^2$ at a contact time of less than 0.5 s. The Bristow Test is known in the art and is summarized below. A test specimen of defined dimensions is affixed to the smooth rim of a wheel free to rotate at a defined constant speed in contact with a stationary test fluid applicator pressing against the test specimen with a defined pressure. The test fluid applicator consists of a test solution storage compartment affixed above a 1 mm by 15 mm test fluid delivery slot, the slot being positioned so that the long dimension is perpendicular to the direction of rotation of the rim of the wheel, and parallel to the wheel axis. A defined quantity of test fluid is placed through the fluid reservoir, onto the fluid delivery slot. With the wheel with the test specimen affixed thereto rotating at constant speed, the test solution applicator is brought into contact with the rotating test specimen and held in place under defined pressure. The test fluid is transferred from the test solution applicator onto the test specimen in a band whose width (controlled by the applicator slot width) is approximately 15 mm, and whose length is function of the absorptive characteristics of the test fluid interaction with the test specimen under the defined test conditions. The amount of liquid absorbed per unit area of test specimen is calculated from the volume of test fluid originally placed in the applicator, and the average width and length of the band created on the test specimen by the transferred test fluid. The time available for the liquid absorption is calculated from the volume of test fluid originally placed in the applicator and applicator geometry. It is noted that the printed images prepared using the systems and methods of the present disclosure are effective for both porous vinyl media and non-porous vinyl media, though it has typically been more difficult to print aqueous inks with acceptable rubfastness on non-porous vinyl media. This is a problem that is solved in particular in accordance with embodiments of the present disclosure.

As used herein, the term "about" is used to provide flexibility to a numerical range endpoint by providing that a given value may be "a little above" or "a little below" the endpoint. The degree of flexibility of this term can be dictated by the particular variable and would be within the knowledge of those skilled in the art to determine based on experience and the associated description herein.

As used herein, the term "substantially" refers to the complete or nearly complete extent or degree of an action, characteristic, property, state, structure, item, or result. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result. For example, a composition that is "substantially free of" particles would either completely lack particles, or so nearly completely lack particles that the effect would be the same as if it completely lacked particles. In other words, a composition that is "substantially free of" an ingredient or element may still actually contain such item as long as there is no measurable effect thereof.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 wt % to about 5 wt %" should be interpreted to include not only the explicitly recited values of about 1 wt % to about 5 wt %, but also include individual values and sub-ranges within the indicated range. Thus, included in this numerical range are individual values such as 2, 3.5, and 4 and sub-ranges such as from 1-3, from 2-4, and from 3-5, etc. This same principle applies to ranges reciting only one numerical value. Furthermore, such an interpretation should apply regardless of the breadth of the range or the characteristics being described.

Methods and systems for inkjet ink printing on non-porous substrates, such as vinyl media, are described herein. In particular the present embodiments utilize an inkjet ink comprising polymer particles that are configured to provide a durable print film on a vinyl medium, where the particles are also configured to be part of a stable inkjettable ink composition. In an embodiment, the polymer particles can comprise a mixture of acrylic latex particles, specifically, styrene and butyl acrylate latex particles. The combination of particles can provide printing with increased durability when compared to inks including only acrylic latex.

The percentages mentioned here are the weight percentages throughout this disclosure. Latex polymers are prepared by the conventional emulsion polymerization techniques of semi-batch process. Such polymers are produced, in an embodiment, using hydrophobic monomers styrene, butyl acrylate, methacrylonitrile, methacrylic acid, and ethylene glycol dimethacrylate in the ratio of 58:20:20:2:0.6.

The styrene content may range from about 50 to 60% and that of butyl acrylate from about 16 to 22%. The sum of these two hydrophobic monomer contents may be between about 70 to 80%.

The amount of methacrylonitrile may be in the range of 17 to 23%. For example, if the polymer has 10% methacrylonitrile, then the desired level of durability is not met. Likewise, if the methacrylonitrile content is increased beyond 25%, for example, 30%, then the durability is not enhanced at all. Higher amounts of methacrylonitrile increase the cost of the latex itself. So the best composition by judging the cost and print durability performance contains about 20% methacrylonitrile. While reference is made to methacrylonitrile above, it will be appreciated that some or all of the methacrylonitrile may be replaced by acrylonitrile on a 1:1 basis.

Higher cross-linking, film formation will be difficult because of the presence of higher rigidity in the polymer chain. At the same time, some amount of acid monomer in the latex is required and it has been found to be less than 4% to meet durability without affecting printability. If this content increases (up to 8%), the printability will improve but further additional increase will affect printability eventually. At the same time, the durability decreases if this amount exceeds 5% in the latex. Therefore, the concentration for methacrylic acid is about 1 to 3% in some embodiments.

Without the cross-linker ethylene glycol dimethacrylate, the latex is not printable in the thermal inkjet ink pen. If the cross-linker content is less than 0.5%, then the shear stability is not achieved. The best composition for this monomer is greater than 0.5% but has to be less than 1%. If the content exceeds 1%, the reliability is maintained somewhat, but the durability is adversely affected.

The surfactant used for the preparation of this latex is Rhodafac® RS 710, which is an APE-Free primary anionic surfactant for acrylic, styrene/acrylic, and vinyl/acrylic latex syntheses, specifically, branched alcohol ethoxylate based phosphate ester, available from Rhodia Novacare (Cranbury, N.J.). However, any other anionic surfactant for acrylic, styrene/acrylic, and vinyl/acrylic latex synthesis may also be used in the preparation of the latexes disclosed herein; examples of such other surfactants include sodium dodecyl sulfate; octylphenol ethoxylates (such as TRITON X 100®, which is commercially available from the Dow Chemical Co. (Midland, Mich.)); ethoxylates of alcohols, amines, amides or acids (such as LUTENSOL® AT 50, which is commercially available from BASF Corp. Reactive surfactants may also be used. Examples of such reactive surfactants include MAXEMUL® 5010, 5011, 6106, and 6112, which is commercially available from Uniquema, a division of Croda (Edison, N.J.); HITENOL® BC-10, BC-1025, BC-20, BC-2020, and BC-30, which is commercially available from Montello, Inc. (Tulsa, Okla.), NOIGEN® RN-10, RN-20, RN-30, RN-40, and RN-5065, which is also commercially available from Montello, Inc.; sodium methallyl sulfonates; sulfopropyl acrylate; vinyl sulfonate; vinyl phosphate; monosodium ethylsulfonate monododecyl maleate; sorbitol acrylate; sorbitol methacrylate; perfluoro heptoxy poly(propyloxy)methacrylate; phenoxyl poly(ethyleneoxy acrylate; phenoxyl poly(ethyleneoxy)methacrylate; nonyl phenoxy poly(ethyleneoxy)crotanate; nonyl phenoxy poly(ethyleneoxy) fumarate; nonyl phenoxy poly(ethyleneoxy)acrylate; nonyl phenoxy poly(ethyleneoxy)methacrylate; mono dodecyl maleate; and allylsulfosuccinate derivatives, such as TREM LT-40®, available from Henkel.

The amount for reliability and print properties may be about 2 to 2.5% with respect to the monomer concentration. If the surfactant quantity is less than about 2%, then the particle size of the latex increases, consequently adversely affecting the reliability and printability, as these particles can settle easily. On the other hand, higher surfactant concentration (greater than about 2.5%) can lead to the formation of smaller size particles, resulting in increased viscosity, consequently leading to poor printability.

The temperature of polymerization is also important for producing latex particles and it has been observed to be at ~90° C. However, the temperature of polymerization may broadly range from about 50° to just below 100°. A lower temperature often produces a large quantity of residual monomer and the removal of such monomers becomes a tedious process, particularly for latexes which involve methacrylonitrile. On the other hand, a higher temperature of polymerization consumes excess energy in processing.

The $T_g$ of the latex particle can be in the range of about 40° to 80° C. in some embodiments, from about 50° to 75° C. in other embodiments, and from about 55° to 70° C. in still other embodiments. These latex particles are made into the ink formulation. The amount of latex can be present from about 2.5 to 8% in some embodiments, from about 3 to 7% in other embodiments, and from about 4 to 6% in still other embodiments. Meanwhile, the ink is made out of pigment dispersion with each colorants. Other additives can be added to formulate inks. These inks were tested on a proto type printer made in Hewlett Packard for the evaluation purposes, as elaborated on more completely in the Examples section below.

The liquid vehicle employed in the inkjet inks may be chosen for suitability with a particular inkjet printing system or for use with a particular print medium. As discussed above, the particles described herein provide a particular benefit formulating aqueous inkjet inks that produce good results on non-porous print media such as vinyl. As such, in a particular embodiment, the inkjet ink vehicle is an aqueous vehicle.

The vehicle may consist essentially of water. Alternatively, additional co-solvents may be included in a vehicle that is predominantly water. More particularly, the vehicle may include organic co-solvents known in the art to be suited for formulating aqueous inkjet inks. Suitable water soluble organic co-solvents, but are not limited to, aliphatic alcohols, aromatic alcohols, diols, triols, glycol ethers, poly(glycol) ethers, lactams, formamides, acetamides, long chain alcohols, ethylene glycol, propylene glycol, diethylene glycols, triethylene glycols, glycerine, dipropylene glycols, glycol butyl ethers, polyethylene glycols, polypropylene glycols, amides, ethers, carboxylic acids, esters, organosulfides, organosulfoxides, sulfones, alcohol derivatives, carbitol, butyl carbitol, cellosolve, ether derivatives, amino alcohols, and ketones. In particular, the co-solvent included may have a vapor pressure such that it will evaporate under heating as least as quickly as the water in the vehicle. In a more particular embodiment, the co-solvent evaporates more quickly than the water upon application of heat.

The pigments suitable for use in the inkjet ink are not particularly limited, and inorganic pigments or organic pigments may be used. Suitable inorganic pigments include, for example, titanium oxide, cobalt blue ($CoO-Al_2O_3$), chrome yellow ($PbCrO_4$), and iron oxide. Suitable organic pigments include, for example, azo pigments, polycyclic pigments (e.g., phthalocyanine pigments, perylene pigments, perynone pigments, anthraquinone pigments, quinacridone pigments, dioxazine pigments, thioindigo pigments, isoindolinone pigments and quinophthalone pigments), dye chelates (e.g., basic dye type chelates and acidic dye type chelate), nitropigments, nitroso pigments, various carbon blacks from Cabot Corp. and Clariant Corp., self-dispersed pigments available from Cabot, or the like.

In conjunction with these or other pigments, non-limiting examples of dispersants that can be used in the formulations of exemplary embodiments of the present disclosure include Solsperse 32000, Solsperse 39000, Solsperse 5000, Solsperse 22000, Disperbyk 163, Disperbyk 167, Disperbyk 168, Disperbyk 180, Disperbyk 190, Disperbyk 191, various Joncryls, or the like.

The inkjet ink compositions can optionally also include wetting agents. Non-limiting examples of such wetting agents can include siliconepolyether acrylate such as Tego Rad 2200 N, Tego Rad 2300, and Byk 358N. The inks can also include polyether modified poly-dimethyl-siloxane wetting agents such as Byk 333, Byk 307, and Silwet L-7604. If used, wetting agents can be present at from 0.01% to about 10% by weight of the inkjet ink composition.

The inkjet ink can further include other additives as needed to provide storage stability and jettability, including biocides, humectants, buffers, viscosity modifiers, sequestering agents, and stabilizing agents.

This system and method can provide durable and waterfast printing on media on which it is typically difficult to achieve such results. In particular, the system and method can be used for printing on media that do not absorb liquid inks well. These include non-porous surfaces such as vinyl. Polymer particles in accordance with the embodiments described herein, when formulated in an inkjet ink, have been found to provide unexpectedly good results on vinyl media. Therefore, in a particular embodiment, the system and method includes printing on vinyl media. However, the inkjet inks containing the latex polymer disclosed herein can also be printed on a variety of other print media, including plain paper and coated and uncoated media, as well as nonporous substrates such as glass, metals, and plastics.

The latex polymers used provide a durable protective film over or throughout the printed ink. In accordance with a general embodiment, formation of print films with these inks can be facilitated by heating of the printed ink and/or the print media to a degree sufficient to cause particle coalescence. The $T_g$ can be selected so that slight or moderate heating can be employed to cause coalescence. More particularly, the polymer particles can be formulated to have a $T_g$ such that the degree of heating needed to cause coalescence does not unduly disrupt the color provided by the ink or damage the print medium. For example, the latex polymer can have a $T_g$ that is within 10° C. of the ambient temperature at which printing occurs. Heating sufficient to cause the printed image to flow can be employed to insure that the proper interaction of particles, colorant, and print surface occurs so as to promote formation of the print film. In a more particular embodiment, the printed ink can be heated to a temperature of about 50° C. to just below 100° C.

One aspect of the present embodiment provides durable inkjet ink printing on vinyl media. As discussed above, it can be difficult to obtain satisfactory inkjet printing on such media, as they do not readily absorb the quantity of liquid ink vehicle usually present in such inks. The present system and method provides an encapsulated print image through coalescence of printed latexes, facilitated in part by removal of a portion of the liquid vehicle. Heating of the printed ink or print medium in accordance with the present embodiment can cause film formation by evaporating away at least a portion of the liquid vehicle, or at least a portion of one of the liquid components of the liquid vehicle. Without being bound to a particular theory, it is believed that the evaporation of the vehicle promotes coalescence by bringing the particles into a denser arrangement. Therefore, the heat applied in the system and method can be sufficient to evaporate at least a portion of the liquid vehicle from the printed ink.

Another factor that can contribute to printing on vinyl media relates to how the vinyl medium itself reacts to the application of heat. That is, application of sufficient heat can cause a vinyl print surface to plasticize and become tacky. This tackiness, in combination with the heat-induced flow of the printed ink and fusion of polymer cores, can facilitate formation of a conformal film on the surface. The film and colorant adheres to the tackified surface, further enhancing the durability of the printed image. Therefore, in a particular embodiment the heat applied is sufficient to cause the vinyl surface to plasticize (without melting or flowing), but at the same time, the heat is sufficient to cause the polymers in the printed ink to flow.

A heating device can be incorporated into a print system in order to heat the media at or near the time of printing. Alternatively, the heating device can be used to heat the ink during or after jetting onto the medium.

Also provided is an inkjet ink printing system and method can comprise at least one inkjet ink that includes the latex polymer (comprising a polymerized mixture of styrene, butyl acrylate, methacrylonitrile, methacrylic acid, and ethylene glycol dimethacrylate) as described herein and a vinyl print medium. The vinyl print medium can be typically any predominantly vinyl material used for durable display of printed images. Examples of such media include, but are not limited to Avery 1005, Avery 3000, Avery 3100, Avery MPI 1005 EZ, Avery MPI 4002, Ultraflex Normandy Pro, Ultraflex JetFlex FL, Ultraflex Strip Mesh, Ultraflex BIOflex, Verseidag Front Lit Standard Easy P/N 7945, LG Bannux 1100, 3M Scotch-Cal, Mactac JT5829, MacTac JT5929p, Intelicoat SBL-7SIJ, Intelicoat GFBL5SIJ, 3M Controltac Plus IJ180C-10, 3M ScotchLight, Dykson Jet 220, C2S Sterling Ultra Gloss and the like.

In accordance with the system and method, an inkjet ink comprising a colorant, an aqueous liquid vehicle, and latex polymer particles is formulated for printing on a vinyl print medium. The resulting printed image can then be heated with a heating device to a temperature that promotes ink film formation and plasticizing of the vinyl print medium, e.g. about 50° C. to 100° C., but that is not high enough to cause the vinyl print medium to flow. As water or other solvent(s) evaporate from the printed ink, the particles coalesce to encapsulate the colorant in a clear film. The temperature at which coalescence occurs is typically determined by the $T_g$ of the polymer. In accordance with one embodiment, the system can include a heating device configured to heat the ink. In a more particular embodiment, the heat source can be configured to heat the ink after it is printed on the print medium. In still another embodiment, the heating device can be configured to heat the surface of the print medium itself. The heating device can heat the surface directly via radiative heat, or can utilize a conductive or transmittive approach such as heating a surface of the medium other than the surface to be printed but in thermal connection with the print surface.

Summarizing and reiterating to some extent, a method of inkjet printing and an associated system are disclosed which provide a durable print film for increased waterfastness and rub resistance. The inkjet ink used can include latex polymer particles. The polymer particles can be configured to create a print film upon being printed upon a print medium. The inkjet ink can provide increased durability with lower particulate content than inks relying solely on acrylic polymer, and so also providing more reliable jetting from inkjet print heads.

EXAMPLES

Example 1

Synthesis of Latex Polymer with the Composition of Styrene, Butyl Acrylate, Methacrylonitrile, Methacrylic Acid and Ethylene Glycol Dimethacrylate in the Ratio of 58:20:20:2:0.6 with Rhodafac® RS710 as Surfactant The monomers styrene (232 g), butyl acrylate (80 g), methacrylonitrile (80 g), methacrylic acid (8 g) and ethylene glycol dimethacrylate (2.4 g) were emulsified in water (160 ml) containing 30% Rhodafac® RS 710 surfactant (33.3 g). Initiator solution was prepared by dissolving potassium persulfate (2 g) in water (160 ml). Water (1160 ml) was heated to 90° C. Then 32 ml of the initiator solution was added to hot water followed by the simultaneous addition of the remaining initiator solution and emulsion. Emulsion addition took 54 min while the initiator addition took 52 min. The reaction mixture was maintained at a temperature of about 90° C. for a period of about 2.5 hours and then cooled to ambient temperature. The pH of this latex was then adjusted to 8.5 with 50% potassium hydroxide solution. It was filtered with 200 mesh filter to obtain the latex in about 20.7% solid with a particle size of 248 nm.

Example 2

Preparation of Ink with Latex Particles

An ink jettable coating composition was prepared by dispersing 6 wt % solid of the composition of Example 1 in a liquid vehicle. This liquid vehicle included 20 wt % organic co-solvent, 0.5 wt % surfactant, 0.5 wt % biocide with the balance being water. The ink also contained about 3 wt % of pigment to impart color.

Example 3

Testing

The inks of Example 2 was filled into inkjet pens and printed with a Hewlett-Packard printer. They were printed on a vinyl media. Rub test results on the ink sample are shown in FIG. 1A (window cleaner test) and FIG. 1B (dry rub test).

Example 4

Synthesis of Latex Polymer with the Composition of Styrene, Butyl Acrylate, Methacrylonitrile, Methacrylic Acid and Ethylene Glycol Dimethacrylate in the Ratio of 58:20:20:2:0.6 with a Reactive Surfactant MAXEMUL® 6106

Example 1 was repeated under identical conditions by replacing the surfactant Rhodafac RS 710 by MAXEMUL® 6106 surfactant in the amount of 4 g. The final solid % obtained was 20.8% with a particle size of 266 nm.

Example 5

Preparation of Ink with Latex Particles

An ink jettable coating composition was prepared by dispersing 6 wt % solid of the composition of Example 4 in a liquid vehicle. This liquid vehicle included 20 wt % organic co-solvent, 0.5 wt % surfactant, 0.5 wt % biocide with the balance being water. The ink also contained about 3 wt % of pigment to impart color.

Example 6

Testing

The inks of Example 5 was filled into inkjet pens and printed with a Hewlett-Packard printer. They were printed on a vinyl media. Rub test results on the ink sample are shown in FIG. 2A (window cleaner test) and FIG. 2B (dry rub test).

Example 7

Comparison

For comparison, the latex was been prepared with the following composition of styrene, butyl acrylate, methacrylonitrile, methacrylic acid and ethylene glycol dimethacrylate in the ratio of 66:20:10:4:0.6. The same results for the prints obtained similar to Example 3 testing is shown in FIG. 3A (window cleaner test) and FIG. 3B (dry rub test).

Example 8

Synthesis of Latex Polymer with the Composition of Styrene, Butyl Acrylate, Methacrylonitrile, Methacrylic Acid and Ethylene Glycol Dimethacrylate in the Ratio of 59.7/18/20/2/0.3 with Rhodafac® RS710 Surfactant Example 1 was repeated under similar conditions by reducing the amount of ethylene glycol dimethacrylate to 1.2 g. The final solid % obtained was 18.6% with a particle size of 289 nm.

Example 9

Preparation of Ink with Latex Particles

An ink jettable coating composition was prepared by dispersing 6 wt % solid of the composition of Example 4 in a liquid vehicle. This liquid vehicle included 20 wt % organic co-solvent, 0.5 wt % surfactant, 0.5 wt % biocide with the balance being water. The ink also contained about 3 wt % of pigment to impart color.

Example 10

Testing

The inks of Example 9 was filled into inkjet pens and printed with a Hewlett-Packard printer. They were printed on a vinyl media. Although rub test and window cleaner test results on the ink sample was very similar to that of Example 3, printability of this ink was much poor. This is due to the much smaller concentration of ethylene glycol dimethacrylate.

As can be seen from the rub tests, if there is any deviation from the optimized composition either in the concentration of the acid, methacrylonitrile or the cross-linker, the durability is affected. Similarly, the printability is also affected as it has been observed that only a few pages can be printed.

While the forgoing exemplary embodiments are illustrative of the principles of the present disclosure in one or more particular applications, it will be apparent to those of ordinary skill in the art that numerous modifications in form, usage and details of implementation can be made without the exercise of inventive faculty, and without departing from the principles and concepts of the disclosure. Accordingly, it is not intended that the invention be limited, except as by the claims set forth below.

What is claimed is:
1. An inkjet printing composition, comprising:
an aqueous liquid vehicle;

at least one pigment having a concentration of about 1 to 5 wt %; and a latex polymer having a concentration of about 2.5 to 8 wt % and comprising a polymerized mixture of:
   styrene, about 50 to 60 wt %;
   butyl acrylate, about 16 to 22 wt %;
   at least one of methacrylonitrile and acrylonitrile, about 17 to 23 wt %;
   methacrylic acid, about 1 to 3 wt %; and
   ethylene glycol dimethacrylate, about 0.5 to 1 wt %,
wherein the sum of concentration of styrene and butyl acrylate is between about 70 to 80 wt % and wherein the glass transition temperature ($T_g$) of the latex polymer is in the range of about 40° to 80° C.

2. The inkjet printing composition of claim 1, wherein the latex polymer comprises a polymerized mixture of:
   styrene, about 58 wt %;
   butyl acrylate, about 20 wt %;
   at least one of methacrylonitrile and acrylonitrile, about 20 wt %;
   methacrylic acid, about 2 wt %; and
   ethylene glycol dimethacrylate, about 0.6 wt %.

3. The inkjet printing composition of claim 1 wherein the $T_g$ of the latex particle is in the range of from about 50° to 75° C.

4. The inkjet printing composition of claim 3 wherein the $T_g$ of the latex particle is in the range of from about 55° to 70° C.

5. The inkjet printing composition of claim 1 wherein the concentration of the latex polymer in the inkjet printing composition is in the range of about 3 to 7%.

6. The inkjet printing composition of claim 5 wherein the concentration of the latex polymer in the inkjet printing composition is in the range of about 4 to 6%.

7. An inkjet ink printing system, comprising:
   a vinyl medium;
   at least one inkjet ink comprising an aqueous liquid vehicle, at least one pigment having a concentration of about 1 wt % to about 5 wt %, and a latex polymer having a concentration of about 2.5 to 8 wt % and comprising a polymerized mixture of:
      styrene, about 50 to 60 wt %;
      butyl acrylate, about 16 to 22 wt %;
      at least one of methacrylonitrile and acrylonitrile, about 17 to 23 wt %;
      methacrylic acid, about 1 to 3 wt %; and
      ethylene glycol dimethacrylate, about 0.5 to 1 wt %,
   wherein the sum of concentration of styrene and butyl acrylate is between about 70 to 80 wt % and wherein the glass transition temperature ($T_g$) of the latex polymer is in the range of about 40° to 80° C.;
   a heating device,
wherein the system is configured such that upon applying heat from the heating device to the inkjet ink printed on the vinyl medium, the latex particles fuse, thereby forming a printed image with a film encapsulating at least a portion of the pigment on the vinyl medium.

8. The inkjet printing system of claim 7, wherein the latex polymer comprises a polymerized mixture of:
   styrene, about 58 wt %;
   butyl acrylate, about 20 wt %;
   at least one of methacrylonitrile and acrylonitrile, about 20 wt %;
   methacrylic acid, about 2 wt %; and
   ethylene glycol dimethacrylate, about 0.6 wt %.

9. The inkjet printing system of claim 7 wherein the $T_g$ of the latex particle is in the range of from about 50° to 75° C.

10. The inkjet printing system of claim 9 wherein the $T_g$ of the latex particle is in the range of from about 55° to 70° C.

11. The inkjet printing system of claim 10 wherein the concentration of the latex polymer in the inkjet printing composition is in the range of about 3 to 7%.

12. The inkjet printing system of claim 11 wherein the concentration of the latex polymer in the inkjet printing composition is in the range of about 4 to 6%.

13. The inkjet printing system of claim 7, wherein the heat from the heating device at which the latex polymer particles fuse is from about 50° to 100° C.

14. The inkjet printing system of claim 7, wherein upon applying the heat from the heating device, at least a portion of the aqueous liquid vehicle evaporates, the vinyl medium plasticizes, and the inkjet ink flows.

15. The inkjet printing system of claim 7, wherein the liquid vehicle further includes at least one organic co-solvent that evaporates more quickly than water upon application of heat from the heating device.

16. A method of forming a printed image with an inkjet ink printing system, comprising
   a vinyl medium;
   at least one inkjet ink comprising an aqueous liquid vehicle, at least one pigment having a concentration of about 1 wt % to about 5 wt %, and a latex polymer having a concentration of about 2.5 to 8 wt % and comprising a polymerized mixture of:
      styrene, about 50 to 60 wt %;
      butyl acrylate, about 16 to 22 wt %;
      at least one of methacrylonitrile and acrylonitrile, about 17 to 23 wt %;
      methacrylic acid, about 1 to 3 wt %; and
      ethylene glycol dimethacrylate, about 0.5 to 1 wt %,
   wherein the sum of concentration of styrene and butyl acrylate is between about 70 to 80 wt % and wherein the glass transition temperature ($T_g$) of the latex polymer is in the range of about 40° to 80° C.; and
   a heating device, wherein the system is configured such that upon applying heat from the heating device to the inkjet ink printed on the vinyl medium, the latex particles fuse, thereby forming a printed image with a film encapsulating at least a portion of the pigment on the vinyl medium, the method comprising:
   jetting the inkjet ink onto the vinyl medium to form the printed image; and
   applying about 50° C. to 100° C. heat to the printed image to cause the latex particles to fuse, thereby forming a film that encapsulates at least a portion of the pigment on the vinyl medium.

17. The method of claim 16, wherein the latex polymer comprises a polymerized mixture of:
   styrene, about 58 wt %;
   butyl acrylate, about 20 wt %;
   at least one of methacrylonitrile and acrylonitrile, about 20 wt %;
   methacrylic acid, about 2 wt %; and
   ethylene glycol dimethacrylate, about 0.6 wt %.

18. The method of claim 16, wherein upon applying the heat from the heating device, at least a portion of the aqueous liquid vehicle evaporates, the vinyl medium plasticizes, and the inkjet ink flows.

19. The method of claim 16, wherein the liquid vehicle further includes at least one organic co-solvent that evaporates more quickly than water upon application of heat from the heating device.

* * * * *